United States Patent
Lindberg et al.

(10) Patent No.: US 7,232,497 B2
(45) Date of Patent: Jun. 19, 2007

(54) METHOD AND DEVICE FOR FILLING A CAVITY BETWEEN TWO PLATES OF FIRE-RESISTING COMPOSITE GLASS

(75) Inventors: Anders Lindberg, Emmaboda (SE); Jan-Olof Lindqvist, Emmaboda (SE)

(73) Assignee: Vetrotech Saint-Gobain (International) AG, Bern (CH)

( * ) Notice: Subject to any disclaimer, the term of this patent is extended or adjusted under 35 U.S.C. 154(b) by 508 days.

(21) Appl. No.: 10/489,209

(22) PCT Filed: Sep. 19, 2002

(86) PCT No.: PCT/CH02/00515

§ 371 (c)(1),
(2), (4) Date: Mar. 8, 2004

(87) PCT Pub. No.: WO03/031173

PCT Pub. Date: Apr. 17, 2003

(65) Prior Publication Data

US 2005/0000623 A1    Jan. 6, 2005

(30) Foreign Application Priority Data

Oct. 4, 2001 (CH) .................................... 1831/01

(51) Int. Cl.
*B32B 38/10* (2006.01)

(52) U.S. Cl. ...................... 156/101; 156/107; 156/109; 156/253

(58) Field of Classification Search ................ 156/101
See application file for complete search history.

(56) References Cited

U.S. PATENT DOCUMENTS

| | | | | |
|---|---|---|---|---|
| 4,299,639 A | * | 11/1981 | Bayer | 156/104 |
| 5,008,049 A | * | 4/1991 | Rose et al. | 264/4 |
| 5,948,195 A | * | 9/1999 | Thomas | 156/109 |
| 6,238,755 B1 | * | 5/2001 | Harvey et al. | 428/34 |
| 6,804,924 B2 | * | 10/2004 | Zurn et al. | 52/514 |

* cited by examiner

*Primary Examiner*—Jessica Ward
(74) *Attorney, Agent, or Firm*—Notaro & Michalos PC

(57) ABSTRACT

A fire-resisting composite glass is comprised of at least two glass plates (1, 2) and an interspaced cavity (6). The distance between the glass plates (1, 2) is determined by an encompassing bead (3) of plastic spacer material. In addition, in the margin region between the glass plates (1, 2) a bead (4) of sealing material is introduced. With the aid of at least one core element an opening is formed in the bead (3) of spacer material for filling the cavity (6). After the filling, this opening is closed with an entrainer stopper and simultaneously the cavity (6) is vented. During the closing the plastic spacer material (3) is joined again in the region of the opening and subsequently the entrainer stopper is covered with sealing material (4). The method and the device for carrying out the method permits the automatic application of encompassing beads (3, 4) of spacer material or of sealing material as well as the sealing and protection of the margin regions before the cavity (6) is filled.

16 Claims, 7 Drawing Sheets

FIG.7
FIG.8
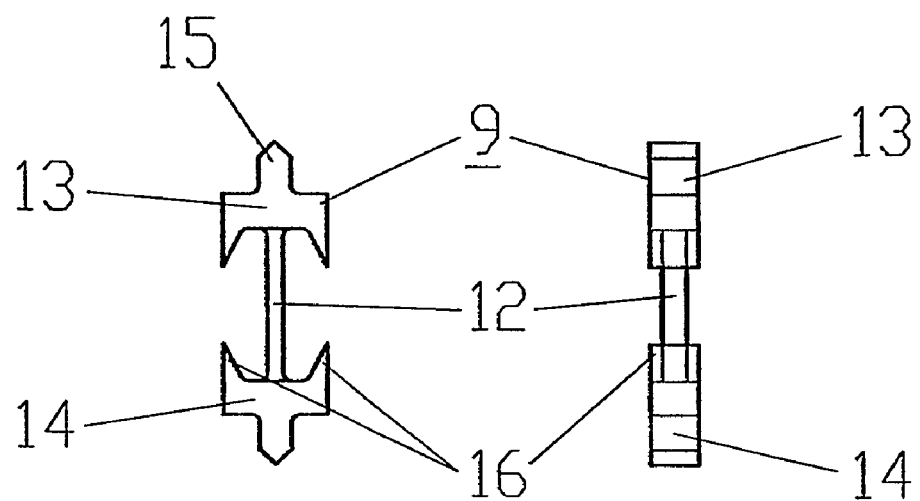
FIG.9
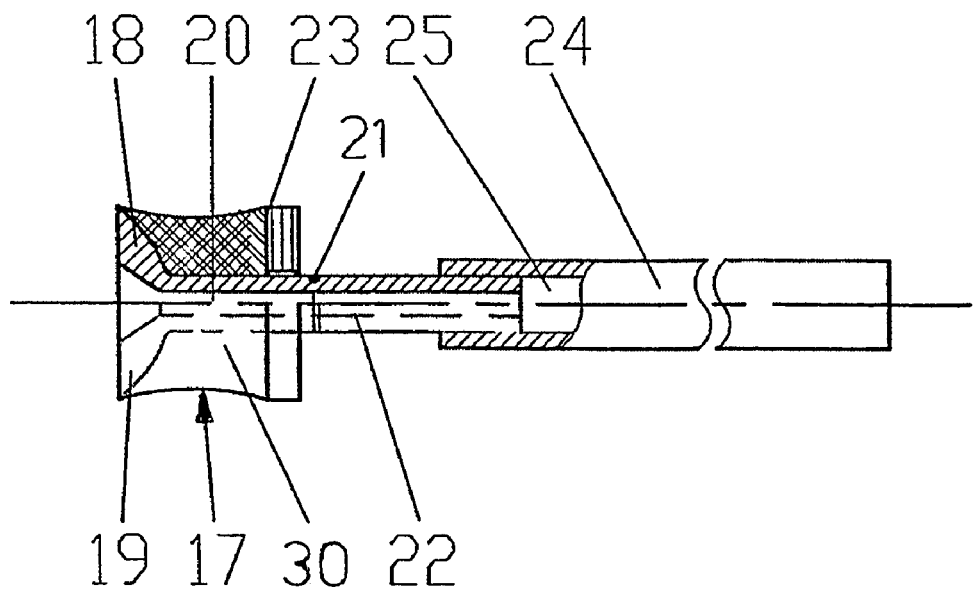

METHOD AND DEVICE FOR FILLING A CAVITY BETWEEN TWO PLATES OF FIRE-RESISTING COMPOSITE GLASS

FIELD AND BACKGROUND OF THE INVENTION

The invention relates to a method for filling a cavity between two plates of glass of a fire-resisting and/or insulating composite glass, in which onto one of the glass plates along the margin region of the inner surface and spaced apart from the edge faces an encompassing bead of plastic spacer material is placed, subsequently the second plate of glass is brought together with the first and placed in contact on the bead of spacer material, the two plates are introduced into a plate press and the structure comprised of plates and spacer material-bead is pressed together to a specific thickness with the formation of a margin groove, the cavity is filled with filler material through openings in the bead and, after filling these openings, they are closed, as well as a device with means for carrying out the method.

Fire-resisting composite glasses of this type are disclosed in EP 0 590 978 B1. In these known fire-resisting composite glasses a water-containing intermediate layer is disposed between two plates of glass arranged at a spacing from one another. The distance between the two glass plates is determined by spacers, with this spacer being comprised of a profile bead of a rigid material, namely metal or ceramics. The connection between the plates of glass and the spacer is established by an adhesive agent based on butyl rubber. On the side directed toward the edges of the glass plates of the spacer a margin groove is formed, which is filled and sealed with an additional sealer material of a synthetic rubber. The production of fire-resisting composite glasses of this type entails various problems. In particular with large-area plates or glasses, it is difficult to form and introduce spacers of rigid material such that a faultless and tight connection is generated between the glass plates and the rigid spacer. Preparing and introducing the spacer in the correct form is elaborate and most often requires manual labor. The openings for filling in the water-containing intermediate layer must be formed previously and their closure, after the cavity between the two glass plates has been filled, is also difficult and elaborate.

It is known from DE 25 55 383 A1 in the case of insulating composite glasses to replace the solid spacer by a bead of spacer material, for example a mixture of polyisobutylene and butyl rubber. This bead of spacer material is extruded by means of an extrusion press directly onto one of the glass plates and the second glass plate is subsequently brought together with the first, and the two plates are pressed together to the desired thickness in a plate press. Filling the cavity between the two glass plates with a filler material, for example a protective gas, is not described here. However, it is known per se, to punch the tube through the bead of spacer material and to fill the protective gas through one or several such tubes. The tubes are subsequently removed and the openings in the bead of spacer material are closed again and an outer layer or a bead of sealer material in the form of polysulfide is additionally applied into the outer margin groove. While the method described here and the associated device permit the automatic application of the bead of spacer material, they do not make possible the simultaneous or immediately following application of the bead of sealer material. The consequence is that the glass plates or composite glasses must be handled very carefully, since the connection of the glass plates via the elastic bead of spacer material is not sufficiently stable. There is also the danger that foreign bodies enter the margin groove and adhere on the spacer. When putting in openings for filling the cavity between the glass plates, fragments of the spacer material or other foreign bodies can also be introduced into the cavity, which can lead to a quality reduction of the composite glass or even to rejects of composite glasses.

SUMMARY OF THE INVENTION

The present invention therefore addresses the problem of providing a method and a device for carrying out this method for preparing, filling and subsequent closing of the cavity between two glass plates, with which the bead of spacer material as well as also the bead of sealer material can be applied automatically and in such a way as to be completely encompassing, therein the outlying bead of sealer material is applied immediately after the glass plates are pressed together to the desired thickness and before the cavity is filled, no foreign bodies are introduced into the cavity between the glass plates during the preparation and closure of the filling openings and the venting of the cavity is possible during the closure of the filling openings.

This problem is solved in a method according to the preamble of patent claim 1 according to the invention through the characterizing characteristics of this patent claim and in a device according to the preamble of patent claim 6 according to the characterizing characteristics of this patent claim 6. Advantageous further developments of the invention result from the characteristics of the dependent patent claims.

With the method according to the invention different advantages are obtained. Thereby that before the glass plates are brought together a core element is emplaced at least at one site of the bead and transversely above the bead of spacer material, the means for preparing the filling openings are already available before the two glass plates are brought together. These can be fire-resisting or insulating composite glasses and the composite glass can be comprised of two glass plates with an interspaced cavity or it can be comprised of several glass plates with several interspaced cavities. After the plate structure has been pressed to the desired thickness, the additional bead of sealer material can be introduced into the margin groove between the spacer material and the edge faces of the glass plates, and this process can take place automatically. This yields the advantage that the plate structure, or the corresponding composite glass, is already completely dimensionally stable before the cavity is filled and no grooves are available in which foreign bodies can collect. The composite glasses can be handled and transported normally and also be transferred to other working stations, for example a filling station. In addition, there is the advantage that the means for preparing a filling opening for the purpose of filling the cavity in the form of the core elements are already available and therefore the bead of spacer material no longer needs to be accessible. To prepare the openings for filling the cavity between two plates of glass, the core element(s) is(are) pulled out of the bead and the plate structure and removed. By pulling out the core element the bead of spacer material is severed on both sides of the core element and partially pulled outwardly and the second outer bead of sealer material is broken through. In the process all of the material, which becomes detached from the two beads, is brought to the outside by means of the core element and no residual material can be introduced into the cavity between two glass plates. Filling each cavity between two glass plates can take place in known manner through the generated opening. In the case of a fire-resisting composite glass, for example, a substance of transparent water-containing alkali polysilicate, such as is known for example from EP 0 620 781 B1, is filled in or, in the case of an insulating composite glass, a known protective gas is introduced. After the cavity between each two glass plates is completely filled, the regions of the bead of spacer material bilaterally to the openings partially pulled outwardly, are again pressed inwardly by means of an entrainer stopper and the openings in this bead are closed again. An improved solution provides that the entrainer stopper is additionally coated with plastic material. The plastic material can be expanded and cooperates with the margin regions of the bead of spacer material. This increases the security of the sealing. In this way the margin groove can again be generated in the proximity of the filling openings and, by introducing additional sealer material, the broken-out region of the second outer bead of sealer material can be completed again. The advantage is simultaneously attained that the original structure of spacer material bead and outer sealer material bead is essentially generated again and the entrainer stopper closing the filling opening, is completely covered with sealer material.

The method step comprising that when emplacing the core element into the bead of spacer material and during the subsequent pressing together of the glass plates only a portion of the cross section of the bead is displaced from the spacer material, offers the advantage that additional spacer material remains available which, after the core element has been pulled out and the filling openings have been created remains available, in order to be able to close the openings subsequently again as completely as possible with spacer material. A further advantage comprises that when pulling out the core elements in the proximity of the generated openings the outlying sealer material is partially broken out, and this permits thereby the core elements to be better grasped manually or with automatic auxiliary means and pulled out. It is also of advantage that the cavity between the glass plates is vented through additional openings during the pressing-in of the entrainer stopper into the opening in the bead of spacer material. This ensures that the spacer material, which, for example, in a fire-resisting composite glass is pressed against the water-containing substance in the cavity between the glass plates, can be brought completely into contact with it and excess air or possibly also excess filler medium can be displaced via these additional openings. After the entrainer stopper has been pressed into the bead of spacer, these additional openings can be closed and sealed again in simple manner during the completion of the second outer bead of sealer material. This process can also be carried out in simple manner and can at least partially be automated.

In particular in the production of fire-resisting composite glasses, but also with insulating composite glasses, the method according to the invention makes possible an automatic production method, in which for applying the spacer materials as well as the sealer materials robots known per se can be utilized. Thereby that the sealing material can be applied along the entire circumference in one piece immediately after pressing the plate structure or the glazing to the desired thickness, an optimum protection of the spacer material bead and of the cavity between two glass plates results. These composite glasses form semi-finished products and can be intermediately stored without any problems and, when required, be transferred to the next working steps.

The entire fabrication process for composite glasses of this type is simplified and can be carried out cost-effectively through the additionally possible automation steps.

The device according to the invention for carrying out the method according to the invention is comprised of several means. A first means forms a core element with a shaped part for the at least partial separation of the spacer material bead. Furthermore, the core element is equipped with at least one entrainer part for generating an opening in the bead of spacer material between the plates. A second means comprises sealing and entrainer elements for closing the spacer material bead and a venting facility. The third means serves for inserting the second means or the entrainer stopper into the spacer material bead between two plates of glass. This third means forms an auxiliary means for handling the second means. This division of the device into several means makes it possible to fit the individual means precisely to the necessary functions and to adapt them to these. The functions can thereby be optimally fulfilled and the individual submeans of the device can be formed and developed more simply. The first means which is developed as a core element, is advantageously formed such that it comprises an inner and an outer head part, with a shaped part being disposed between these head parts as a web. The height of the head parts is maximally as great as the distance between the glass plates and the height of the web is lower than the height of the head parts. This implementation makes possible that a core element, which is placed transversely over the bead of spacer material before the glass plates are brought together, displaces only partially the bead in the proximity of the web. Placing a nose on the outer head part of the first means or of the core element permits grasping and pulling the core element from the bead by means of an auxiliary tool. The entrainers, disposed on the inner head part of the first means or of the core element, are directed toward the bead of spacer material and, when pulling the core element from the composite glass, they extend into the bead of spacer material. This offers the advantage that when the bead is torn open in the proximity of the desired filling opening and is severed during the process of pulling-out, the two end regions of the bead are at least partially drawn outwardly in the form of a funnel. The entrainers consequently form opening means for the bead of spacer material between each of two glass plates.

The second means, which forms an entrainer stopper, comprises entrainer shoulders, which extend into the spacer material bead, as well as a continuous bore, which extends from the side facing the cavity toward the edge region of the composite glass. The end regions of the spacer material bead on both sides of the filling opening can be grasped by means of the entrainer shoulder and, during the pressing-in of the entrainer stopper or of the second means between two glass plates, can be pressed inwardly and again against one another. The continuous bore permits air or possibly also excess filler material to escape from the cavity between the glass plates. The tube piece disposed on the end, facing away from the cavity between the plates, of the second means serves as a connection means to the third means and simultaneously comprises a predetermined breaking point. This predetermined breaking point serves for the purpose of breaking off a potentially overlong part of the tube piece and removing it from the margin groove after it has been completely pressed into the spacer material bead. This has the advantage that no subpiece of the second means projects beyond the edge regions of the glass plates. The second means or the entrainer stopper is coated with a plastic material over the circumference of a subregion. This is the same material as that used for the spacer bead, for example butyl rubber, or another known and suitable material. This plastic material promotes and improves the sealing effect of the entrainer stopper. By means of a contact pressure plate, which can be moved from the outside toward to the inside, the plastic material is expanded transversely to the push-in direction.

The third means is detachably connectable with the second means, and specifically via the tube piece. It forms a holding element for the second means or the entrainer stopper, with which this entrainer stopper can be inserted and pressed into the interspace between two glass plates and consequently into the opening in the bead of spacer material. In this third means is also disposed a venting bore, which cooperates with the bore in the second means. After the cavity between each of two glass plates has been filled, the second means or the entrainer stopper is inserted into the openings in the bead of spacer material, or pressed into it, and closes these openings. The entrainer stopper cooperates therein via the entrainer shoulder with the bead and forms with the spacer material a form-fit unit. The venting facility in the second means or in the entrainer stopper is closed through the outside sealing means.

During the application of the bead and subsequent pressing of the glass plates into a composite glass, an encompassing groove is advantageously formed between the bead of spacer material and the edge faces of the glass plates and this groove is filled with sealing material. As especially suitable sealing materials have been found to be materials from the group of elastomers, for example polysulfide elastomers.

BRIEF DESCRIPTION OF THE DRAWINGS

In the following the invention will be explained in further detail in conjunction with embodiment examples with reference to the enclosed drawing. Therein depict.

DESCRIPTION OF THE PREFERRED EMBODIMENTS

Figure 1:
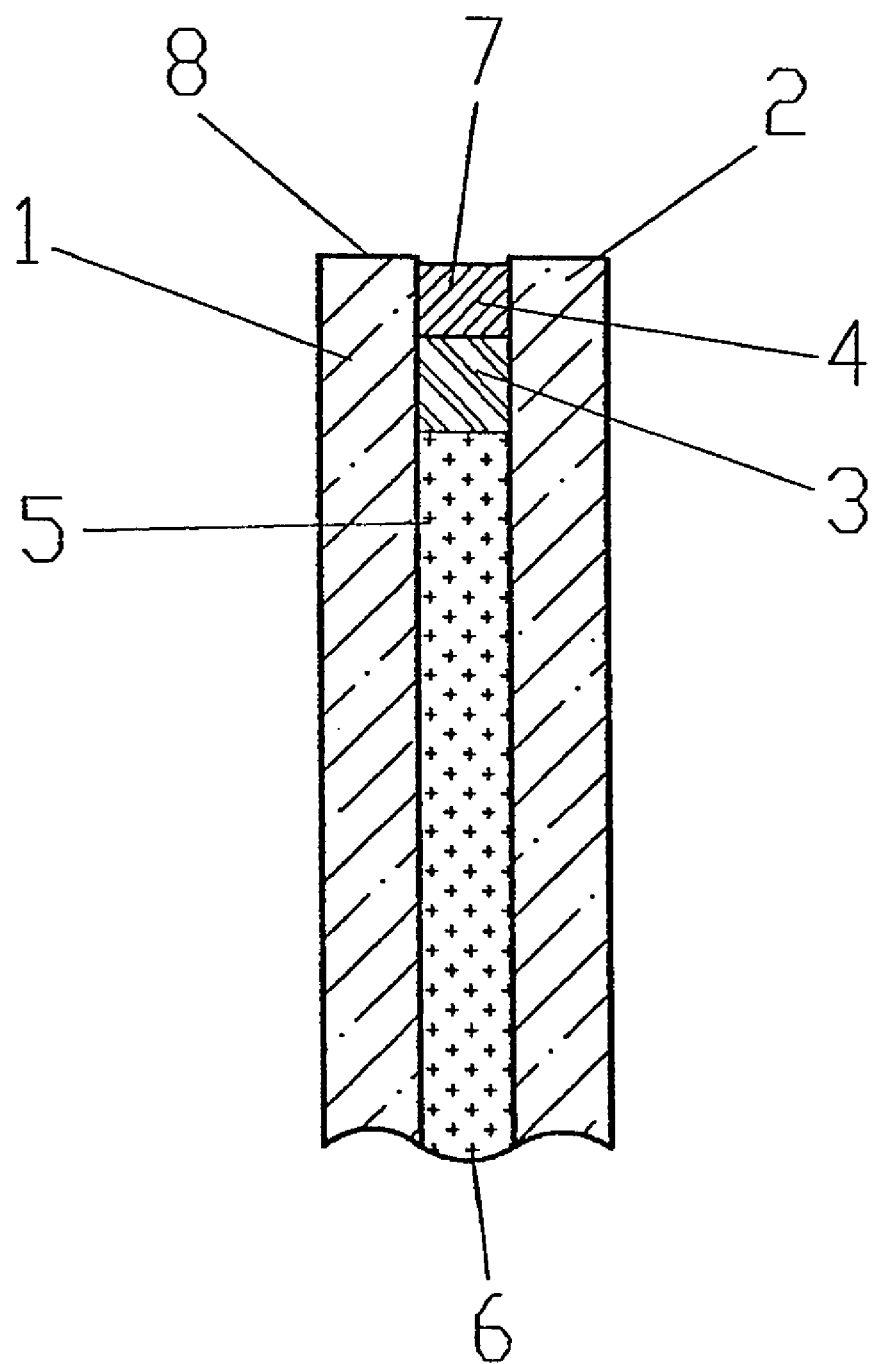
FIG. 1 the margin region of a fire-resisting composite glass in section.

FIG. 1 shows a cross section through the margin region of a fire-resisting composite glass. The depicted fire-resisting composite glass comprises two plates of thermally prestressed float glass of 1, 2 or 5 mm thickness each. These two glass plates 1, 2 are disposed spaced apart from one another, with the distance between them being determined by a bead 3 or spacer material. Between the two glass plates 1, 2 a cavity 5 is formed in known manner and filled with a fire-resisting substance 6. This fire-resisting substance 6 can be, for example, a cured transparent water-containing alkali polysilicate substance, such as is described in EP 0 620 781 B1 or another known substance. After it has been filled into the cavity 5 between the two plates of glass 1, 2, this polysilicate substance 6 is cured. The spacer material bead 3 is comprised of an extruded bead of a butyl polymer, such as is described for example in DE 199 22 507 A1. A device for applying such a spacer material bead 3 onto one of the glass plates 1, 2 is described for example in DE 25 66 383 A1. Between the spacer material bead 3 and the edge faces 8 of the two glass plates 1, 2 a margin groove 7 is developed, which is filled with a sealing material bead 4. Suitable materials for this sealing material bead 4 can be from the group of elastomers, and a polysulfide elastomer is found to be especially suitable. The two beads 3, 4 are developed such that they encompasse the entire composite glass and completely encompass the cavity 5 or the fire-resisting substance 6. The fire-resisting composite glass can in known manner also have more than two plates and several cavities with corresponding margin sealing. The structuring shown in FIG. 1 of two glass plates to form a fire-resisting composite glass takes place in a manner such that first onto one of the two glass plates 1, 2 for example, onto the inside of the glass plate 1, with the help of a calibrated extrusion die of an extrusion device an approximately 6 mm thick bead of a butyl polymer is extruded such that it is completely encompassing. The glass plate 2 is subsequently placed onto it and the stack of the two glass plates 1 and 2 and the interspaced spacer material bead 3 is introduced into a plate press and, in a manner known per se, pressed together to the nominal distance. In the present example the entire stack is pressed to a total thickness of 16 mm. With an appropriate extrusion die the sealing material bead 4 is subsequently introduced into the margin groove 7, such that the entire margin region is sealed and the two glass plates 1 and 2 in the margin region are dimensionally stably connected with one another and adhered. In this state the cavity 5 is not yet filled with fire-resisting substance 6 and this substance must now be filled in.

Figure 2:
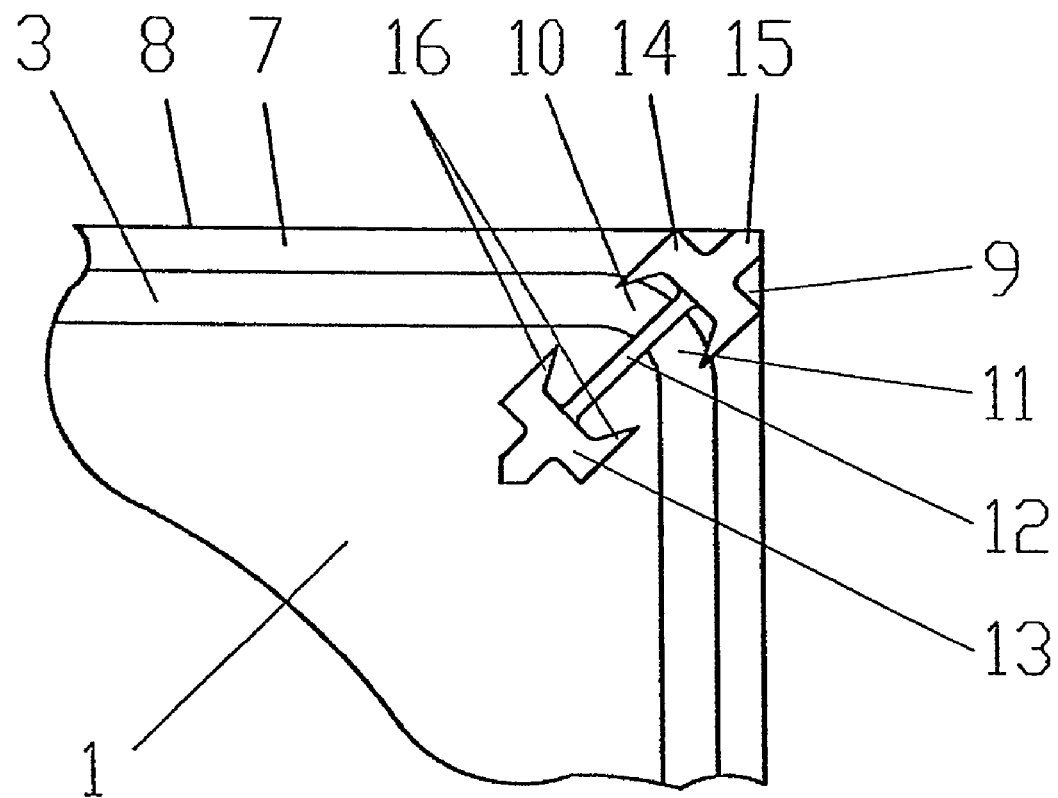
FIG. 2 a corner region of a first plate with spacer material bead and core element, FIG. 3 a section through a corner region of a fire-resistent composite glass with the core element pulled out, FIG. 4 a section through a corner region of a fire-resistent composite glass after the cavity has been filled with second and third means of the device, FIG. 5 the same section as in FIG. 4 after the contact pressure plate has been shifted, FIG. 6 a section through a corner region of a fire-resisting composite glass after the filling and after closure of the filling opening, FIG. 7 a plan view of a first means or corner element, FIG. 8 a section through the corner element according to FIG. 6, and FIG. 9 a second and a third means of the device in partial section.

In order to be able to fill the fire-resisting substance 6 into the cavity 5 between the two glass plates 1, 2 at least one filling opening and one venting opening must be available. Usefully one opening is provided at a corner of the fire-resisting composite glass, which forms the filling as well as the venting opening. But it is also possible to provide one opening each at opposite corners of the fire-resisting composite glass. According to the invention, appropriate means for generating these openings are already installed during the fabrication process of the structure of the composite of both plates 1, 2. The method process for preparing the filling and venting openings as well as for the subsequent closing of these openings is depicted in FIGS. 2 to 6 corresponding to the method steps. FIG. 2 shows a plan view onto a segment of a corner region of the glass plate 1, onto which the spacer material bead 3 has already been applied. In the corner shown as well as in the opposite corner of glass plate 1 now a first means or a core element 9 is emplaced transversely over the spacer material bead 3, and this core element 9 does not project beyond the edge face 8 of glass plate 1. The thickness of the core element 9 is maximally as large as the nominal distance between the two glass plates 1 and 2 after they have been pressed together. The core element 9 comprises head parts 13 and 14, which are in contact on the innser face of glass plate 1. Between the two head parts 13, 14 a shaped part 12 is developed, which is less thick than the two head parts 13, 14. This shaped part 12 is pressed into the spacer material bead 3 and displaces the butyl polymer in this region. At least on the outer head part 14 a nose 15 is disposed. This nose 15 serves for the purpose of being able to grasp the core element 9 with an auxiliary tool and pull it out of the fire-resistant glazing. At least on the inner head part 13 entrainers 16 are disposed, which are directed toward the spacer material bead 3 and form cutting edges. In the depicted example of the core element 9 the two head parts 13 and 14 are developed symmetrically, i.e. they both comprise a nose 15 as well as also entrainers 16. This has the advantage that the core element 9 can also be installed in a position rotated by 180°.

As soon as a core element 9 has been emplaced and pressed into the spacer material bead in the specific corner region of the glass plate 1, the second glass plate 2 can be placed onto it and the plate composite, as already described, is now pressed together to the desired nominal thickness in a plate press. The core element 9 is now located in a corner region of the fire-resisting composite glass between the two glass plates 1, 2 without projecting beyond the edge faces 8. Applying the sealing material bead 4 in the margin groove 7 can now take place automatically, since there are no projecting parts and a potential extrusion robot can be driven about the full circumference of 360° around the fire-resisting composite glass. In the case of a composite of more than two plates, these processes are carried out several times, until the desired number of cavities has been formed.

Figure 3:
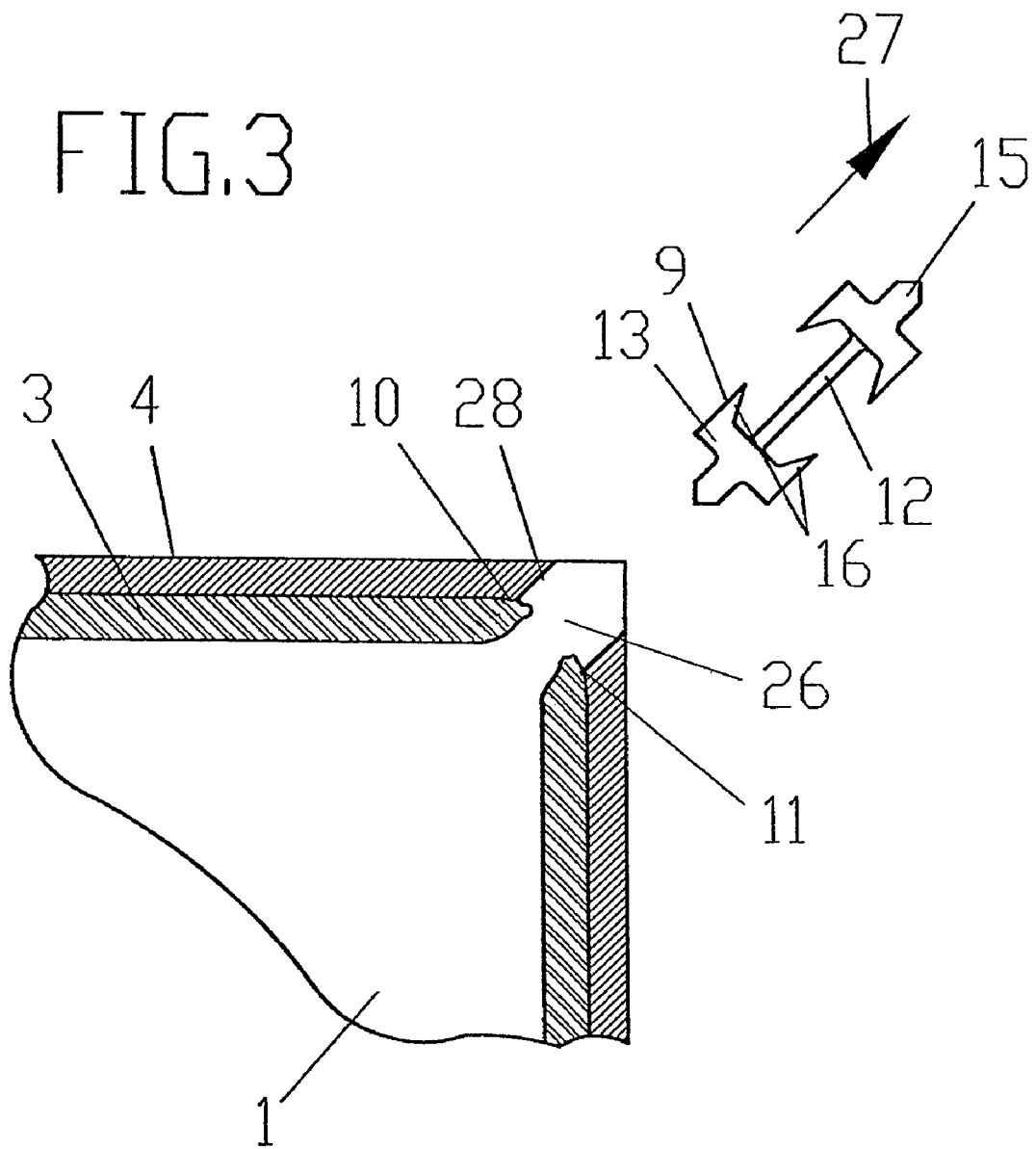

FIG. 3 shows the corner region of the fire-resisting composite glass after the filling or venting opening 26 has been generated. This opening 26 is generated thereby that the core element 9 is pulled out of the fire-resisting composite glass in the direction of arrow 27. For this purpose an auxiliary tool known per se is utilized, by means of which the core element 9 can be grasped by the nose 15 and pulled out. When pulling out the core element 9, the entrainers 16 on the inner head part 13 extend into the spacer material bead 3, sever it and pull parts of it toward the outside. In the region, in which the shaped part 12 had been pressed into the bead 3, the bead 3 tears open and the two outwardly directed end regions 10, 11 of the spacer material bead 3 are formed. During the pulling-out of the core element 9 the sealing material bead 4 is simultaneously torn open and broken out at least in region 28 of opening 26. This generates a funnel-form opening 26 after the core element 9 has been completely pulled out. In the same way, at one of the other corners of the fire-resisting composite glass, advantageously at the opposite one, a second opening can be generated. Through these two openings 26, for example from a lower opening, the fire-resisting substance 6 can be filled into the cavity 5, with the air being able to escape through the upper opening. Fire-resisting substance 6 is filled in until cavity 5 is completely filled. As soon as cavity 5 is completely filled with fire-resisting substance 6, the single or both openings are closed again. If only one opening 26 had been generated, the fire-resisting substance 6 is filled through this opening 26 and the venting occurs simultaneously via this same opening 26.

Figure 4:
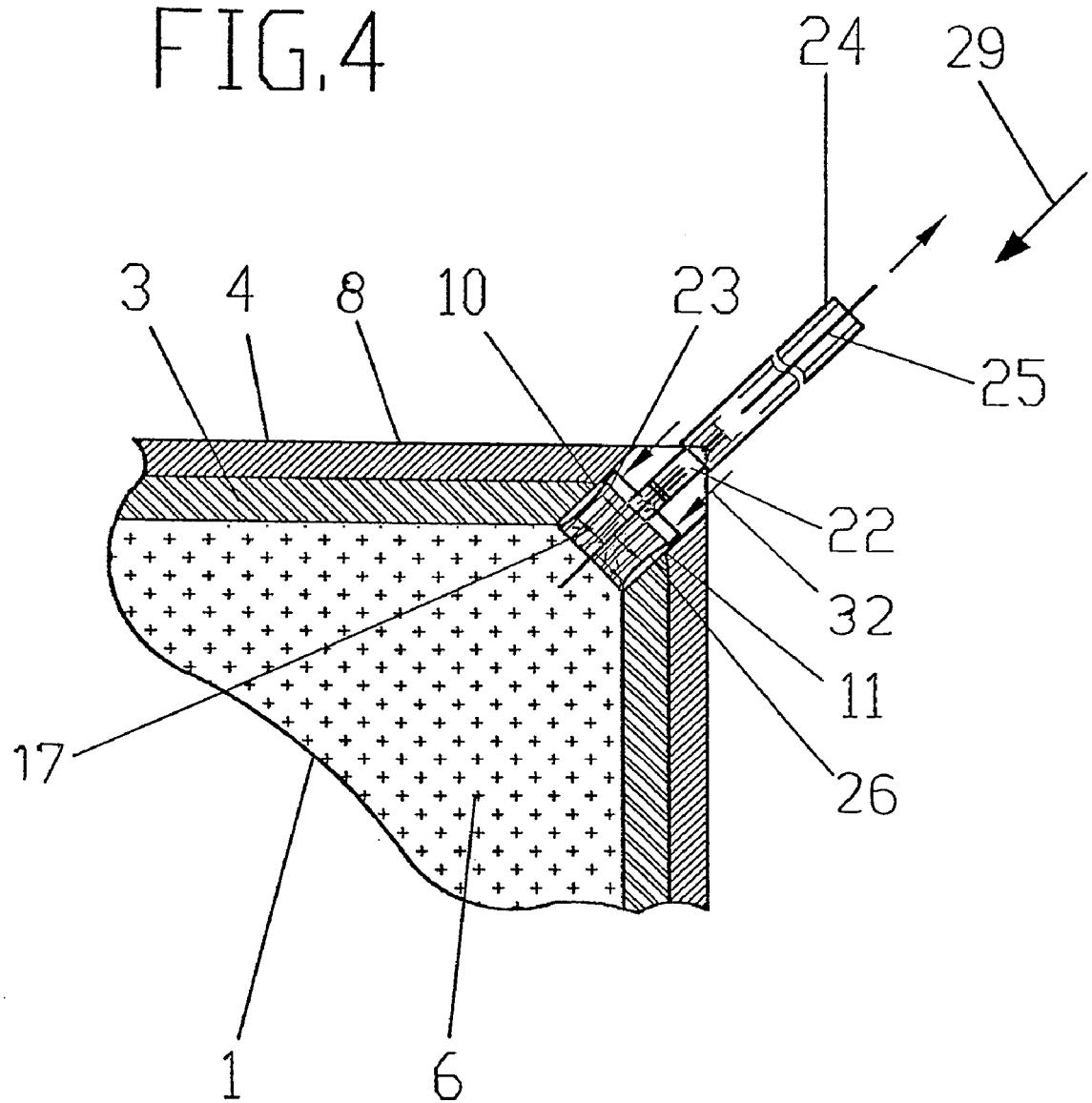
Figure 5:
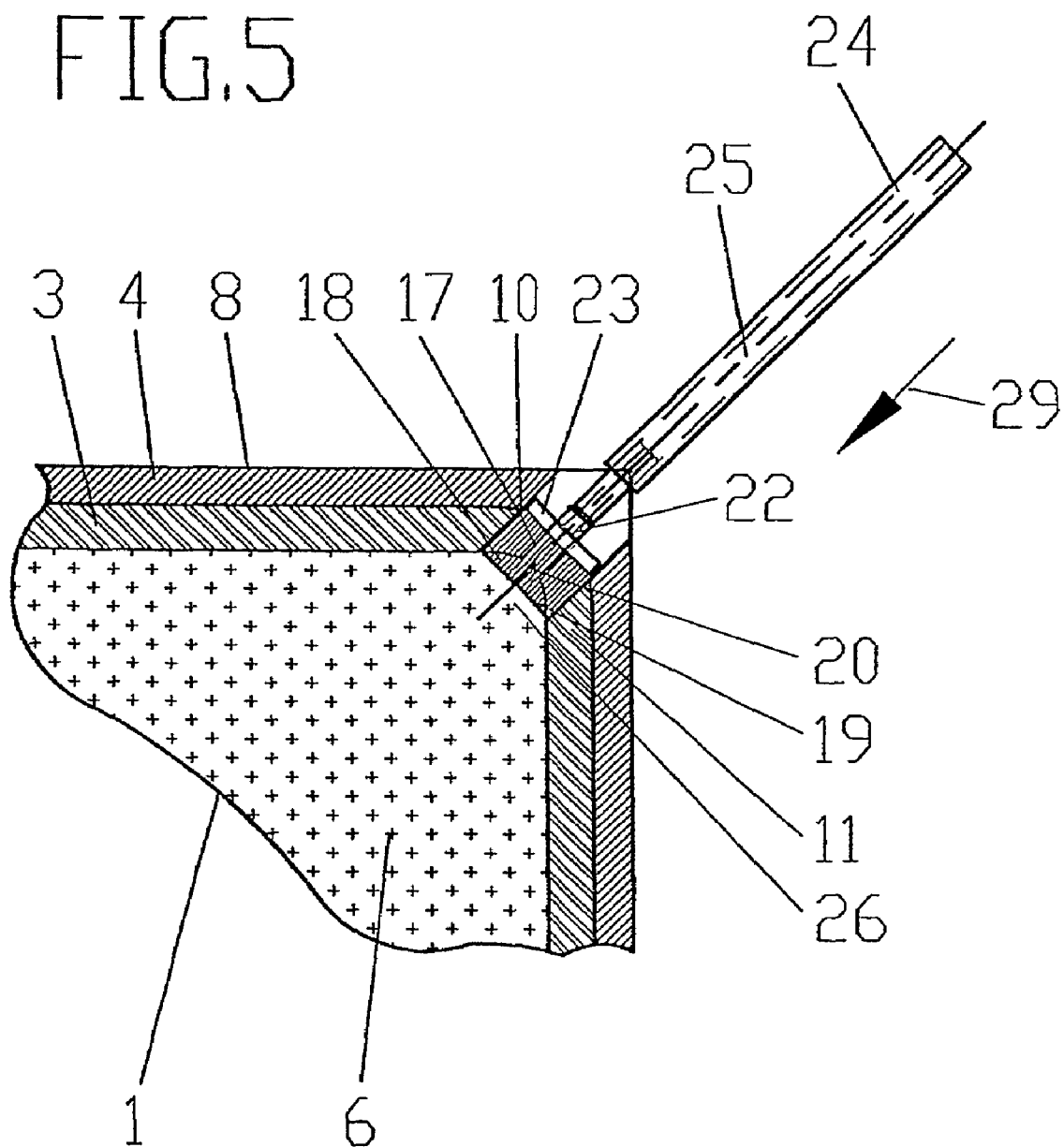
Figure 6:
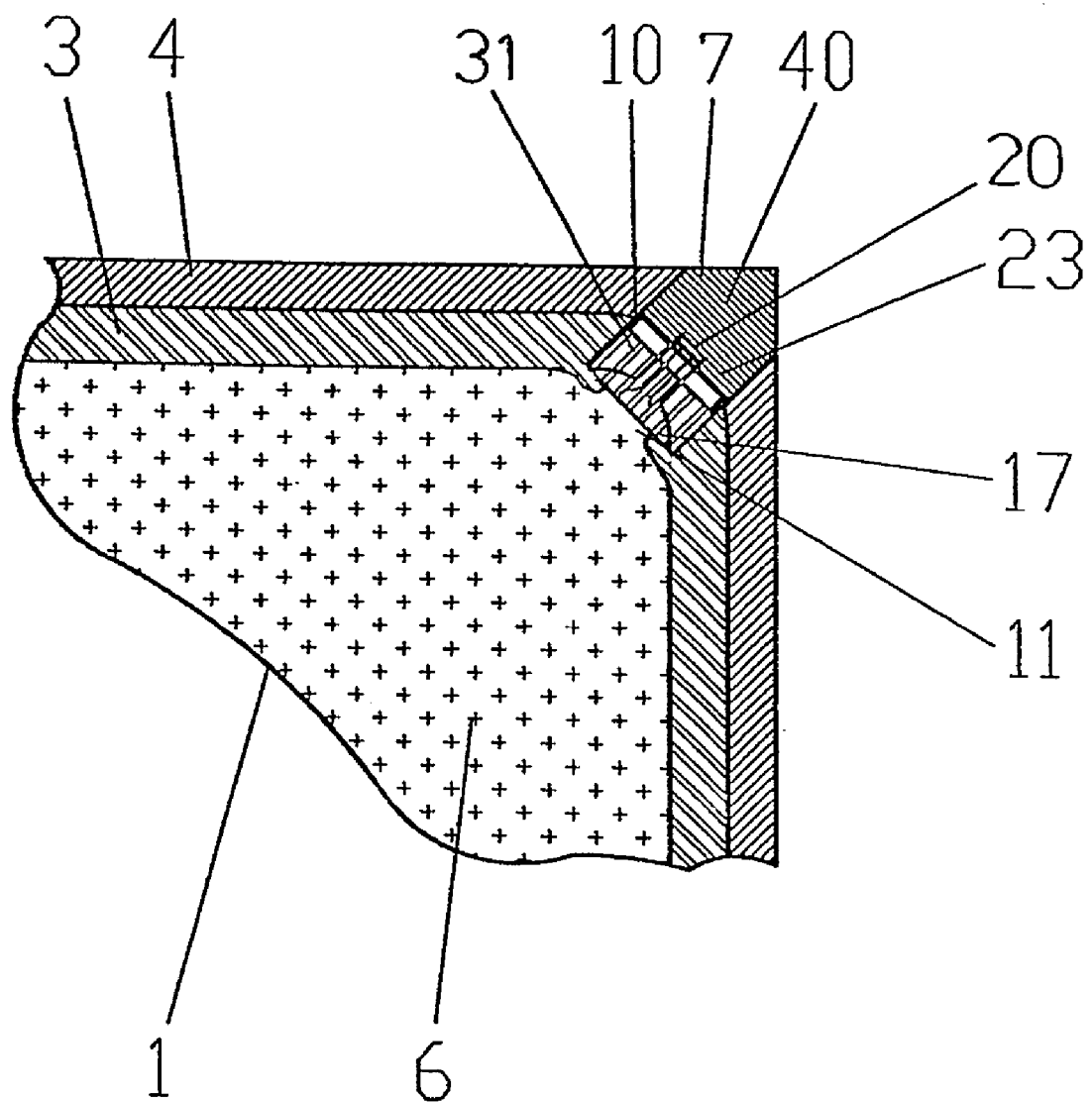

The closing process of opening 26 after the fire-resisting substance 6 has been filled into cavity 5 is shown in FIG. 4. A second means, in the form of an entrainer stopper 17 is used for closing the opening 26. This entrainer stopper 17 cooperates with a third means 24, which serves as an auxiliary element for handling and inserting the entrainer stopper 17 or the second means. The entrainer stopper 17 or the second means and the third handling means 24 are shown precisely in FIG. 9. Entrainer stopper 17 comprises at its front end two entrainer shoulders 18, 19, which extend into the end regions 10, 11 of spacer material bead 3 when the entrainer stopper 17 is pushed from the outside in the direction of arrow 29 into opening 26 by means of the third means 24. On the outwardly directed region of entrainer stopper 17 is disposed a tube piece 22, on which a contact pressure plate 23 is slidingly guided. Through the entire entrainer stopper 17 extends a bore 20, which serves as a venting facility. In the third means 24 is also provided a venting bore 25, such that when closing the opening 26 air, potentially still present, or also excess filler material can escape from cavity 5 to the outside. For closing the opening 26, the entrainer stopper 17 is pushed with the aid of the third means 24 in the direction of arrow 29, and during this process the two end regions 10 and 11 of spacer material bead 3 come to lie in contact on entrainer stopper 17 and the bead 3 is closed tightly again. On entrainer stopper 17 a region 30 is developed, which is located between the entrainer shoulders 18, 19 and a contact pressure plate 23. This region 30 is coated with plastic material 31. In the described example, butyl rubber is employed as the plastic material. But other materials can also be used, which form a sealing connection with the material of bead 3. When entrainer stopper 17 is in the position depicted in FIG. 4, the contact pressure plate 23 is pushed inwardly in the direction of arrow 32 and therewith the material 31 is pressed together and expanded transversely to the direction 29 in which it is pushed in. Thereby a form-fit connection between the two end regions 10,11 of bead 3 is formed. Since material 31 expands radially in all directions, in the contact region to the glass faces of plates 1, 2 also a tight adhesion connection is formed again. In FIG. 5 the entrainer stopper 17 is shown with material 31 pressed together, i.e. with the contact pressure plate 23 pushed in. On tube piece 22 of entrainer stopper 17 a predetermined breaking point 21 is located, which, after the entrainer stopper 17 has been completely pushed in, is located within the edge faces 8 of plates 1, 2 or the margin groove 7. The tube piece 22 is broken off at this predetermined breaking point 21 by means of the third means 24, such that there are no longer any parts projecting beyond the edge face 8. FIG. 6 shows the corner region after the tube piece 22 has been broken off at the predetermined breaking point 21 and after the third means 24 has been removed. That region of margin groove 7, from which the sealing material 4 has been broken out, is subsequently filled again with sealing material 40 and the sealing arrangement in the margin region is again completed. This final state is shown in FIG. 6. It is here evident that by means of the entrainer stopper 17 or of the second means of the device, the two end regions 10, 11 of the spacer material bead are again directed inwardly. Through the contact pressure plate 23 pushed inwardly, the spacer material is additionally pushed inwardly and the plastic material 31 is radially expanded, whereby the entrainer stopper 17 is completely enclosed in the spacer material bead 3. The complete sealing now takes place with the additionally introduced sealing material 40, which completely encompasses the entrainer stopper 17 and seals it against the outside. Therewith the bore 20 in entrainer stopper 17 is also closed and sealed off.

FIG. 7 shows a plan view onto a core element 9 and FIG. 8 a cross section along the longitudinal axis. The core element 9 consists of the two head parts 13, 14, which are connected with one another via the shaped part 12 and are developed symmetrically. Both head parts 13, 14 comprise noses 15 and entrainers 16. In particular FIG. 7 shows clearly that the shaped part 12 is less thick than the two head parts 13, 14. The two head parts 13, 14 are developed symmetrically in order to facilitate handling them or orienting them during installation.

FIG. 9 is a partial section through the entrainer stopper 17 and the third means 24 detachably connected with the entrainer stopper 17. The entrainer stopper or the second means 17, have at their front end the two entrainer shoulders 18, 19 and at the rear end the tube piece 22. Through the entire entrainer stopper 17 extends a continuous bore 20. At tube piece 22 is located a predetermined breaking point 21, which serves for separating the rear region of the tube piece 22. The contact pressure plate 23 is guided displaceably on the tube piece 22 and slid onto it. In region 30 plastic material 31, for example butyl rubber, is disposed. However, the entrainer stopper 17 can also fulfill its sealing function if no plastic material 31 is provided. In the present case the third means 24, representing an auxiliary element, comprises a tube piece, which is placed with a tight fit onto the rearmost region of the tube piece 22 of the entrainer stopper 17. In this way, the relatively small entrainer stopper 17 can be handled better and specifically also with automatic mounting tools, for example a robot. Potential filling material, which exudes during the installation of the entrainer stopper 17 into opening 26 from the cavity 5 between the two glass plates 1, 2 through bore 20, is conducted to the outside via the venting bore 25 in the third means 24 and the margin groove 7 is not contaminated in any way by the potentially exuding material. This has the advantage that the entire region, which is sealed off with additional sealing material 40, remains completely clean and the faultless adhesion is ensured of the sealing material 40 on the surface of both glass plates 1, 2 in the region of the margin groove 7. After the entrainer stopper 17 and the contact pressure plate 23, as described above, have been completely slid into the margin region of the margin groove 7, the contact pressure plate 23 is located in front of the predetermined breaking point 21. The rear end of tube piece 22 is broken off in this position by means of the third means 24 and removed from the margin groove 7.

The is claimed is:

1. A method for filling a cavity (5) between two glass plates (1, 2) of a fire-resisting and/or insulating composite glass, comprising the steps of:
    depositing a first encompassing bead of plastic spacer material (3) on one of the glass plates (1) along a margin region of an inner face and spaced apart from edge faces (8);
    placing the other one of glass plates (2) on the first bead (3) of spacer material;
    pressing the plates (1, 2) and the first bead of spacer material together to a specific thickness to form a margin groove (7);
    filling the cavity (5) through at least one opening in the first bead (3) of spacer material with a filler material (6); and,
    closing the at least one opening,
    wherein, before the glass plates is placed on the bead of spacer material, at least one core element (9) is placed transversely over a portion of the first bead (3) of spacer material corresponding to the at least one opening,
    wherein, after pressing the plates to the desired thickness, a second encompassing bead of sealing material (4) is introduced into the margin groove between the glass plates, at least partially covering the at least one core element,
    wherein, before filling the cavity, each core element is pulled out of the first bead of spacer material and removed, severing the first bead (3) of spacer material on both sides of each core element, partially pulling outward regions (10, 11) of the first bead of spacer material on both sides of each core element, and breaking through the second bead of sealing material to form a funnel-form opening, and
    wherein, after filling the cavity (5), the regions (10, 11) on both sides of each opening pulled outwardly of the first bead (3) of spacer material are pressed inwardly with an entrainer stopper (17), and each broken-out region of the second bead (4) of sealing material is filled with a third bead of sealing material with the entrainer stopper (17) completely covered with the second and third beads of sealing material.

2. Method for filling a cavity (5) between two glass plates (1, 2) of a fire-resisting and/or insulating glazing as claimed in claim 1, characterized in that each core element (9) during its placement onto the first bead (3) of spacer material and during the subsequent pressing together of the glass plates (1, 2) displaces a portion of a cross section of the bead (3) of spacer material.

3. Method for filling a cavity (5) between two glass plates (1, 2) of a fire-resisting and/or insulating glazing as claimed in claim 1, characterized in that by pulling out each core element (9) in a region of a developing opening (26), an outlying portion of the second bead of sealing material (4) is partially broken out.

4. Method for filling a cavity (5) between two glass plates (1, 2) of a fire-resisting and/or insulating glazing as claimed in claim 1, characterized in that the entrainer stopper (17) is coated with a plastic material (31) in a region (30) between the shoulders (18, 19) of the entrainer stopper and a contact pressure plate (23) and, after the entrainer stopper (17) has been pushed into each opening (26) in the first bead (3) of spacer material, the plastic material (31) is expanded transversely in a direction (29) in which the entrainer stopper has been pushed in and each opening (26) is closed through the cooperation with the regions (10, 11) of the first bead (3) of spacer material.

5. Method for filling a cavity (5) between two glass plates (1, 2) of a fire-resisting and/or insulating glazing as claimed in claim 1, characterized in that the cavity (5) between the glass plates (1, 2), while the entrainer stopper (17) is pressed into the at least one opening in the bead (3) of spacer material, is vented through one or more additional openings (20), and the additional openings (20) are closed with the completion of the second bead (4) of sealing material.

6. Method for filling a cavity (5) between two glass plates (1, 2) of a fire-resisting and/or insulating glazing as claimed in claim 1, wherein the pressing step comprises introducing the plates into a plate press.

7. A device for carrying out the method as claimed in claim 1, for filling a cavity in fire-resisting and/or insulating glazings, in which at least two glass plates (1, 2) are disposed spaced apart and delimit the cavity (5), wherein between the glass plates (1, 2) and along margin regions thereof, a first bead (3) of elastic spacer material is disposed and a means for filling filler material into the cavity between the glass plates is provided, characterized in that the device comprises:
    a first means (9) with a shaped part (12) for the at least partial severing of the first bead (3) of spacer material and with at least one head part for generating an opening (26) in the first bead (3) of spacer material between the plates (1, 2), wherein the first means (9) comprises a core element,
a second means (17) with a venting facility (20) and with sealing and entrainer elements (18, 19) for closing each opening (26), and
a third means (24) for inserting the second means (17) into each opening (26) in the first bead (3) of spacer material.

8. Device for filling a cavity in fire-resisting and/or insulating glazings as claimed in claim 7, characterized in that the first means (9) developed as a core element comprises an inner and an outer head part (13, 14), wherein, between the inner and outer head parts (13, 14), the shaped part (12) is disposed as a web, the height of the head parts (13, 14) is maximally as great as the distance between the glass plates (1, 2) and the height of the web (12) is less than the height of the inner and outer head parts (13, 14).

9. Device for filling a cavity in fire-resisting and/or insulating glazings as claimed in claim 7, characterized in that the outer head part (14) of the first means or of each core element (9) comprises a nose (15), which forms a grasping element for an auxiliary tool for pulling each core element (9) out of the first bead (3) of spacer material.

10. Device for filling a cavity in fire-resisting and/or insulating glazings as claimed in claim 7, characterized in that on the inner head part (13) of the first means or of the entrainers of each core element (9) are disposed and are directed toward the first bead (3) of spacer material and the entrainers (16), while they are being pulled out, extend into the first bead (3) of spacer material and form opening means for the first bead (3) of spacer material.

11. Device for filling a cavity in fire-resisting and/or insulating glazings as claimed in claim 7, characterized in that the second means (17) comprises entrainer shoulders (18, 19) which extend into the first bead (3) of spacer material and include a first continuous bore (20),
wherein on the end of the second means facing away from the cavity (5) between the plates (1, 2), a tube piece (22) is disposed, which adjoins the first bore (20), and on the tube piece (22), a predetermined breaking point (21) is disposed.

12. Device for filling a cavity in fire-resisting and/or insulating glazings as claimed in claim 7, characterized in that the third means (24) is detachably connectable with the second means (17) and forms a holding element for the second means (17), and in the third means (24), a venting bore (25) is disposed, which cooperates with the first bore (20) in the second means (17).

13. Device for filling a cavity in fire-resisting and/or insulating glazings as claimed in claim 7, characterized in that the second means (17) in a region (30) between the entrainer shoulders (18, 19) and a contact pressure plate (23) is coated with a plastic material (31) and the contact pressure plate (23) is displaceable in the direction of the entrainer shoulders (18, 19).

14. Device for filling a cavity in fire-resisting and/or insulating glazings as claimed in claim 7, characterized in that between the first bead (3) of spacer material and the edge faces (8) of the glass plates (1, 2), an encompassing margin groove (7) is developed and the margin groove (7) is filled with a first sealing material (4).

15. Device for filling a cavity in fire-resisting and/or insulating glazings as claimed in claim 14, characterized in that the first sealing material (4) is a suitable elastomer or elastomeric material.

16. Device for filling a cavity in fire-resisting and/or insulating glazings as claimed in claim 14, characterized in that, after the cavity (5) has been filled, the second means (17) closes each opening in the first bead (3) of spacer material and cooperates with the first bead (3) of spacer material, and the first bore (20) is closed by a second sealing material.

* * * * *